US012160174B2

(12) United States Patent
Camiolo et al.

(10) Patent No.: US 12,160,174 B2
(45) Date of Patent: Dec. 3, 2024

(54) USB INTERFACE

(71) Applicants: STMicroelectronics (Grenoble 2) SAS, Grenoble (FR); STMicroelectronics S.r.l., Agrate Brianza (IT)

(72) Inventors: Jean Camiolo, Sassenage (FR); Francesco Ferrazza, Milan (IT); Nathalie Ballot, Sassenage (FR)

(73) Assignees: STMicroelectronics (Grenoble 2) SAS, Grenoble (FR); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/389,940

(22) Filed: Dec. 20, 2023

(65) Prior Publication Data
US 2024/0128877 A1 Apr. 18, 2024

Related U.S. Application Data

(63) Continuation of application No. 17/373,881, filed on Jul. 13, 2021, now Pat. No. 11,888,400.

(30) Foreign Application Priority Data

Aug. 7, 2020 (FR) ...................................... 2008346

(51) Int. Cl.
    *H02M 3/335* (2006.01)
    *G06F 13/42* (2006.01)
    *H02M 1/32* (2007.01)

(52) U.S. Cl.
    CPC .... *H02M 3/33523* (2013.01); *G06F 13/4282* (2013.01); *H02M 1/32* (2013.01);
    (Continued)

(58) Field of Classification Search
    CPC ............ H02M 3/335; H02M 3/33523; H02M 3/33569; H02M 3/33576; H02M 1/32; G06F 13/4282; G06F 2213/0042
    See application file for complete search history.

(56) References Cited

U.S. PATENT DOCUMENTS

| 4,590,546 A | 5/1986 | Maile |
| 5,973,945 A | 10/1999 | Balakrishnan et al. |

(Continued)

FOREIGN PATENT DOCUMENTS

| CN | 1833262 A | 9/2006 |
| CN | 102882395 A | 1/2013 |

(Continued)

*Primary Examiner* — Gary L Laxton
(74) *Attorney, Agent, or Firm* — Slater Matsil, LLP

(57) ABSTRACT

In an embodiment, a USB interface includes a transformer, a primary winding of the transformer, and a first switch in series between a first and a second node, a secondary winding of the transformer and a component in series between a third and a fourth node, the fourth node configured to be set a first reference potential, a second switch connected between the third node and a first terminal, the first terminal configured to provide an output voltage of the USB interface; wherein the component is configured to avoid a current circulation in the secondary winding when the first switch is closed and a control circuit configured to compare a first voltage of an interconnection node between the secondary winding and the component to a first threshold and compare the first voltage to a second threshold when the first voltage is, in absolute values, above the first threshold.

20 Claims, 3 Drawing Sheets

(52) U.S. Cl.
CPC ... *H02M 3/33569* (2013.01); *H02M 3/33576* (2013.01); *G06F 2213/0042* (2013.01)

(56) References Cited

U.S. PATENT DOCUMENTS

| | | |
|---|---|---|
| 6,967,585 B2 | 11/2005 | Lomax, Jr. et al. |
| 9,030,117 B2 | 5/2015 | De Anna et al. |
| 11,050,350 B1 | 6/2021 | Choi |
| 2010/0061121 A1 | 3/2010 | Udagawa |
| 2010/0182808 A1 | 7/2010 | Sato |
| 2014/0268914 A1 | 9/2014 | Wang |
| 2015/0280573 A1* | 10/2015 | Gong ............... H02M 3/33592 363/21.14 |
| 2015/0285872 A1 | 10/2015 | Chung |
| 2016/0373019 A1 | 12/2016 | Hsu |
| 2017/0138987 A1 | 5/2017 | Aldinger et al. |
| 2017/0353099 A1 | 12/2017 | Yang |
| 2018/0019587 A1 | 1/2018 | Chen |
| 2018/0175737 A1 | 6/2018 | Kikuchi |
| 2019/0020282 A1 | 1/2019 | Li |
| 2020/0007046 A1 | 1/2020 | Chen |
| 2020/0153327 A1 | 5/2020 | Lin et al. |

FOREIGN PATENT DOCUMENTS

| | | |
|---|---|---|
| CN | 107634567 A | 1/2018 |
| CN | 108110729 A | 6/2018 |
| FR | 2560464 A1 | 8/1985 |
| JP | H09182418 A | 7/1997 |
| JP | 2002095250 A | 3/2002 |
| JP | 2018113832 A | 7/2018 |
| WO | WO-2017099768 A1 * | 6/2017 |

\* cited by examiner

USB INTERFACE

CROSS-REFERENCE TO RELATED APPLICATIONS

This application is a continuation of U.S. application Ser. No. 17/373,881, filed on Jul. 13, 2021, which claims the benefit of French Patent Application No. 2008346, filed on Aug. 7, 2020, which applications are hereby incorporated reference herein in their entirety.

TECHNICAL FIELD

The present disclosure relates generally to interfaces for supplying power from a power supply source to a load. The disclosure more particularly relates to a Universal Serial Bus interface, or USB interface, connected between a source of power, such as the mains, and a USB connector; the USB connector is intended to be electrically coupled to a load to be supplied, in particular by a USB cable.

BACKGROUND

Although, currently, wireless connection is one of the main research axes in the field of power and data exchange, cables and connectors still seem to be the most reliable way to connect a plurality of electronic devices, be it to exchange data or power or charge one or a plurality of electronic devices.

Among the different types of cables and connectors of the USB standard, the USB type C enables the exchange of data and power. The USB-PD technology ("USB Power Delivery") is a technology that adapts to USB type C cables and connectors. Such a technology enables the management of the power of electronic devices.

SUMMARY

Embodiments provide an improved USB interface powering a load from a power source, in particular of USB interfaces adapted to the USB-PD technology.

One embodiment provides a USB interface comprising a transformer, a first switch, and a primary winding of the transformer series connected between a first node and a second node, a second switch connected between a third node and a first terminal configured to receive an output voltage of the interface, a secondary winding of the transformer series connected with a component between a fourth node configured to receive a reference potential and the third node, the component is configured to avoid a current circulation in the secondary winding when the first switch is closed and a control circuit configured to compare a first voltage of an interconnection node between the secondary winding and the component to a first threshold and to compare said first voltage to a second threshold when said first voltage is, in absolute values, above the first threshold.

According to one embodiment, the control circuit is configured to determine the first threshold based on a set point value of the output voltage.

According to one embodiment, the interface further comprises a first capacitor connected between the first and second nodes, in parallel with the first switch and the first winding; and a rectifying bridge configured to receive a second AC voltage and to provide a third voltage on the first node and a second reference voltage on the second node.

According to one embodiment, the first threshold is determined so that when the first voltage is, in absolute values, above the first threshold, the first voltage is representative of the third voltage.

According to one embodiment, the second threshold is determined by a nominal value of the second AC voltage.

According to one embodiment, the second threshold is determined so that when the first voltage is comprised between the first and second thresholds, the second voltage is lower than said nominal value.

According to one embodiment, the control circuit is further configured to compare said first voltage to a third threshold when said first voltage is, in absolute values, above the first threshold, the third threshold being determined by said nominal value, so that, when the first voltage is, in absolute value, above the third threshold, the second voltage has a value higher than said nominal value.

According to one embodiment, the control circuit is further configured to send a message to a load connected between the fourth node and the first terminal when said first voltage is, in absolute values, above the first threshold and below the second threshold.

According to one embodiment, the control circuit is further configured to send a message to the load when said first voltage is, in absolute values, above the third threshold.

According to one embodiment, the control circuit is further configured to control the first and the second switches.

According to one embodiment, the interface comprises a second capacitor connected between the third and fourth nodes.

According to one embodiment, the secondary winding is connected between the fourth node and the interconnection node, and the thresholds are negative, the component is, for example, a diode having an anode connected to the interconnection node.

According to one embodiment, the component is connected between the fourth node and the interconnection node, and the thresholds are positive, the component is, for example, a diode having an anode connected to the fourth node.

According to one embodiment, the relative polarity of a voltage on the primary winding is opposite to the relative polarity of a voltage on the secondary winding.

One other embodiment provides a method implemented in a USB interface as described above, the method comprising: comparing, with the control circuit, the value of the first voltage with the first threshold; and comparing, with the control circuit, the value of the first voltage with the second threshold, when the absolute value of the first voltage is above the absolute value of the first threshold.

BRIEF DESCRIPTION OF THE DRAWINGS

The foregoing features and advantages, as well as others, will be described in detail in the following description of specific embodiments given by way of illustration and not limitation with reference to the accompanying drawings, in which.

Like features have been designated by like references in the various figures. In particular, the structural and/or functional features that are common among the various embodiments may have the same references and may dispose identical structural, dimensional, and material properties.

DETAILED DESCRIPTION OF ILLUSTRATIVE EMBODIMENTS

For the sake of clarity, only the operations and elements that are useful for an understanding of the embodiments described herein have been illustrated and described in detail. In particular, the management of the negotiation phase, which is implemented between a source and a load or sink to negotiate, i.e., determinate the supply power to be supplied to the load from a supply source, is not described in detail. Furthermore, only the relevant aspects of the USB-C and USB-PD technologies are described; the other aspects adapt themselves unchanged. In particular, the data exchange function via connectors, and if applicable, a cable of the USB type C, preferably adapted to the USB-PD technology, is not described, the described embodiments being compatible with the standard data exchange function of the USB-C and USB-PD technologies.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, a component connected between two nodes or terminals means that the component has a first conduction terminal coupled, preferably connected, to the first of the two nodes or terminals and a second conduction terminal coupled, preferably connected, to a second of the two nodes or terminals.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially," and "in the order of" signify within 10% and preferably within 5%.

Figure 1:
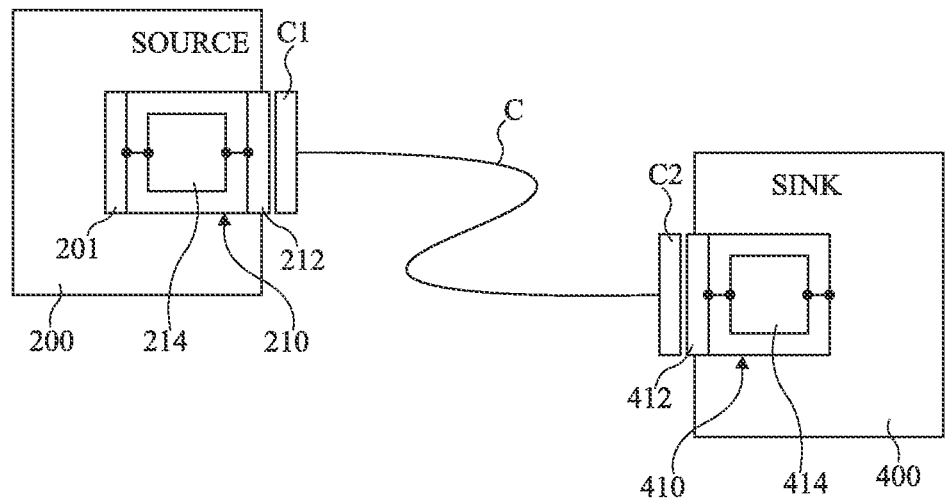
FIG. 1 is a schematic view illustrating a USB connection between a supply source and a load to be supplied.

FIG. 1 is a schematic view illustrating a USB connection between device 200, acting as a supply source (SOURCE), and an electronic device, or load, to be supplied 400, playing the role of a load (SINK). In this example, the devices 200 and 400 are connected by means of a cable C of the USB type C, preferably adapted to the USB-PD or USB "POWER DELIVERY" technology.

The supply device 200 comprises a source of an electrical supply power 201. The source 201 is the electrical distribution grid, i.e., the mains, which delivers an alternating voltage, or AC voltage. As an example, the AC voltage delivered by the mains has a nominal value, i.e. a nominal root means square value, equal to 230 V or 110 V.

The cable C comprises, at each of its ends, a connector C1, C2 of the USB type C, in this example adapted to the USB-PD technology. The connectors C1, C2 may be identical.

A coupling element 210, respectively 410, comprising a USB interface 214, respectively 414, and a USB connector 212, respectively 412, is arranged on the side of the device 200, respectively of the device 400. The interface 214, respectively 414, couples the source 201, respectively the load 400, to the USB connector 212, respectively 412. The connectors 212 and 412 are configured to cooperate with a connector C1 and C2 of cable C or directly with connector 412, respectively 212. The interfaces 214, 414 may be identical.

The USB interfaces 214 and 414 allow the transmission of data, for example, via cable C when it is present, between the source 200 and the load 400.

The USB interfaces 214, 414 allow the supply power supplied by the supply source 201 to be adapted as a function of the supply power supplied to the load 400. Preferably, the connection interfaces 214, 414 allow the supply power supplied by the mains 201 to be adapted as a function of a supply power requested by the device 400, in particular in the case where the USB-PD technology is implemented. More particularly, in the following description, interfaces 214, 414 enable to adapt the supply power delivered by mains 201 according to a set point supply power required by load 400, particularly in the case where the USB-PD technology is implemented. To achieve this, interface 214 comprises an AC/DC power converter (not shown in FIG. 1) controlled to generate, from power source 201, the negotiated power supply to load 400.

Although not represented in FIG. 1, the USB interface 414 of the device 400, playing the role of the load, may be connected to a power supply source, for example, the mains or a battery; the interface 414 is then connected between the power supply source and the connector 412. This is, for example, when the devices 200 and 400 correspond to a TV and a set-up box connected to the TV. Indeed, in this case, the TV and the set-up box are connected to the mains. In this case, the TV and the set-up box may respectively play the role of the source 200 and the load 400, or conversely.

During a connection, for example, managed by the USB-PD technology, communication is established between the devices 200 and 400 to decide on the electrical supply power necessary for the device 400 to be able to be supplied and/or recharged. More particularly, the device 400 indicates via its interface 414 the minimum supply power required for its operation and the device 200 indicates via its interface 214 the supply powers that it is capable of supplying. A negotiation, in this example, managed by the USB-PD technology, then begins to define what power the device 200 will supply to the device 400. Once this negotiation is complete, the USB interface 214 controls its voltage converter according to the result of the negotiation in order to generate, from the mains 201, the negotiated power supply that is provided to the load.

As an example, the supply powers that device 200 is capable of supplying are selected from among a list of predefined or predetermined supply powers; the list, for example, is stored in interface 214. Preferably, this list is predefined or predetermined, for example, by a standard. Each supply power of this list is characterized by a plurality of values, in particular by a set point value of the voltage that device 200 is supposed to deliver to load 400. In the USB-PD technology, each set of values characterizing a predefined supply power corresponds to a set of information designated by the acronym PDO ("Power Data Object"), which can be transmitted between devices 200 and 400 adapted to the USB-PD technology to define, during a negotiation, the power that the device 200 is supposed to deliver to the load 400.

Once the negotiation is ended, interface 214 adapts the supply power of mains 201 according to the result of the negotiation, after which the power supply of device 400 starts. The voltage converter of interface 214 is then controlled in accordance with the result of the negotiation to adapt the power of power source 201 to the negotiated power.

While the device 400 is powered by the device 200, the device 400 may exchange data with other devices, such as wireless communication. These data may be critical, for example, when corresponding to an update of firmware of the load.

However, during a data exchange between the load 400 and another device, if the mains 201 is lost, i.e. the interface 214 is disconnected from the mains 201 or the AC voltage delivered by the mains 201 experiences an important decrease, for example, of more than 10% of its nominal value, the interface 214 is no longer able to provide the negotiated power supply to the load 400. As a result, the data the load 400 is exchanging, for example, the data the load 400 is receiving by wireless communication, may be corrupted or lost. Such loss or corruption of data could block the load 400, which could require a factory return.

It would be desirable that the interface 214 can detect when the mains 201 is lost. More particularly, it would be desirable that interface 214 can detect a mains 201 loss so that dispositions can be taken before the source 200 is no longer able to supply load 400, thus avoiding that data exchanged by load 400 with another device are corrupted or lost.

Figure 2:
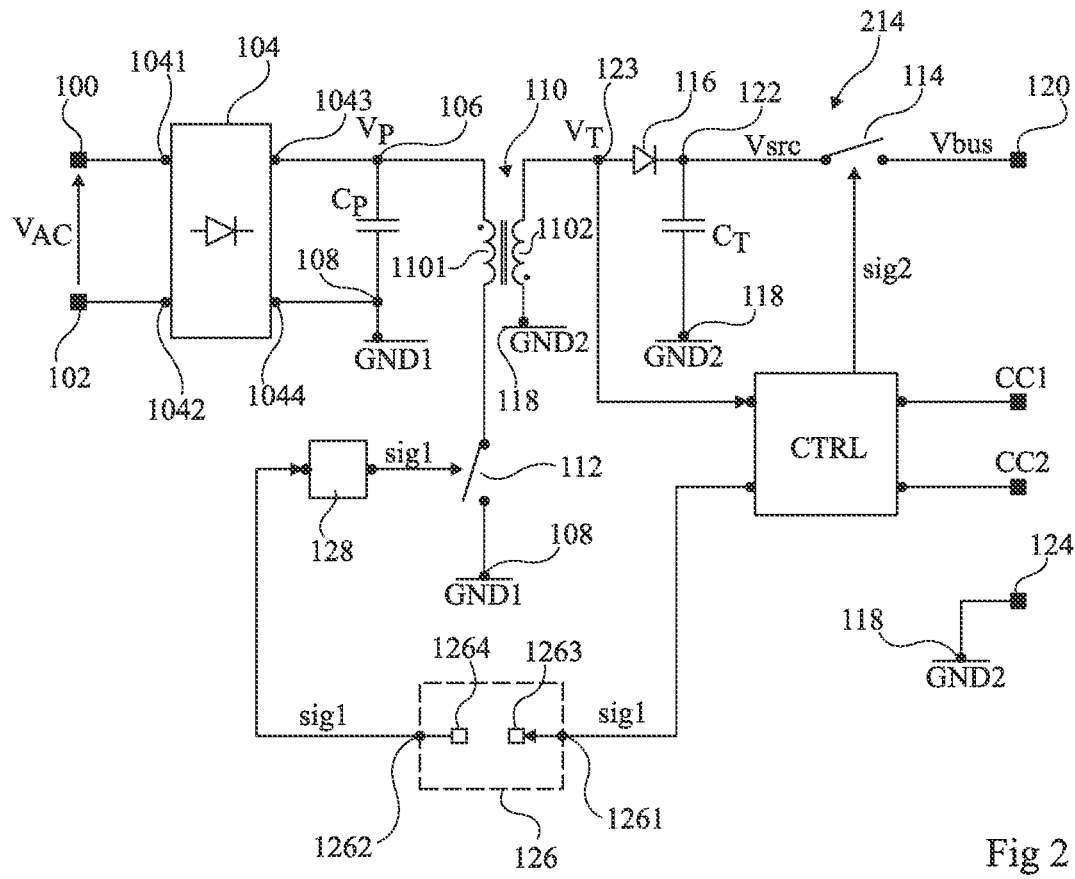
FIG. 2 illustrates an embodiment of a USB interface adapted to the USB-PD technology.

FIG. 2 illustrates an embodiment of a USB interface 214 adapted to the USB-PD technology.

Interface 214 comprises two terminals, 100 and 102. The terminals 100 and 102 are configured to be connected to the mains 201 (FIG. 1) so that an AC voltage $V_{AC}$ is applied between terminals 100 and 102.

Interface 214 comprises a rectifying bridge 104. The rectifying bridge 104 has two input terminals, 1041 and 1042, coupled, for example, connected, to the respective terminals 100 and 102. The terminals 1041 and 1042 are configured to receive the voltage $V_{AC}$. The rectifying bridge 104 has two output terminals 1043 and 1044. Terminal 1043 of the rectifying bridge 104 is coupled, preferably connected, to node 106 of interface 214. Terminal 1044 is coupled, preferably connected, to node 108 of interface 214. The rectifying bridge 104 is configured to provide a redressed voltage $V_P$ to node 106, voltage $V_P$ being referenced to a reference potential GND1 and being, for example, positive. The node 108 is configured to receive the reference potential GND1.

The interface 214 comprises a transformer 110. The transformer 110 comprises a primary winding 1101 and a secondary winding 1102. The transformer 110 is configured so that the relative polarity (positive or negative) of a voltage across the winding 1101 is opposite to that of a voltage across the winding 1102.

The winding 1101 is series-connected with switch 112 between nodes 106 and 108. More particularly, in this example, the winding 1101 has a terminal connected to node 106 and the switch 112 has a conduction terminal connected to node 108.

A capacitor $C_P$ is connected between nodes 106 and 108, the capacitor $C_P$ is then connected in parallel with the association in series of the winding 1101 and the switch 112.

The winding 1102 is series connected with a switch 114 and a component 116 between node 118 of interface 214 and an output node or terminal 120 of interface 214. More particularly, the winding 1102 and component 116 are series connected between node 118 and node 122, the switch 114 being connected between node 122 and terminal 120.

The node 118 is configured to receive a reference potential GND2. The Terminal 120 is configured to receive an output voltage Vbus of interface 214, referenced to the potential GND2. Interface 214 comprises an output node or terminal 124 configured to receive the potential GND2, terminal 124 being coupled, preferably connected, to node 118. The transformer 110 implements galvanic insulation between terminals 100 and 102 and terminals 120 and 124.

Component 116, a diode in the example of FIG. 2, is configured to avoid a current flowing through the winding 1102 when switch 112 is closed.

The winding 1102 is connected to an interconnection node 123, to which component 116 is also connected, i.e. node 123 is an interconnection node between winding 1102 and component 116.

In the present embodiment, the winding 1102 is connected between node 118 and node 123, the component 116 is connected between node 123 and node 122. In this example, where component 116 is a diode, diode 116 has its anode coupled, preferably connected, to node 123 and a cathode coupled, preferably connected, to node 122. In FIG. 2, the phase points of windings 1101 and 1102 are represented; the phase point of winding 1101 is, for example, on the side of node 106, and the phase point of winding 1102 is, for example, on the side of node 118.

Interface 214 comprises a capacitor CT connected between nodes 122 and 118. Interface 214 comprises at least one communication terminal. The output terminals 120 and 124 and the communication terminals are all intended to be coupled to the USB connector 212 (not shown), which then allows the coupling with the device 400, for example, via the connector C1, the cable C and the connector C2, as shown in FIG. 1. When device 400 is coupled to interface 214, and switch 114 is closed, device 400 is powered by the voltage Vbus.

In this embodiment, interface 214 comprises two communication terminals, CC1 and CC2. One advantage of having two communication terminals is that, if these terminals are positioned symmetrically on the connector 212, this makes it possible to manufacture a reversible connector C1, which is to say, a connector C1, for example, with a rectangular shape, that can be coupled to the connector 212 in a first direction and a second direction opposite to the first.

Interface 214 comprises a control circuit CTRL. The circuit CTRL is configured to control switch 112. In other words, the circuit CTRL is configured to provide a control signal sig1 to switch 112. For example, the circuit CTRL provides the signal sig1 to an input 1261 of circuit 126; for example, an optocoupler is configured to transmit the signal sig1 to an output 1262 of circuit 126 while ensuring galvanic insulation between its input 1261 and its output 1262. Circuit 126, for example, comprises a photodiode 1263 configured to transmit a light signal having an optical power determined by the signal sig1 received on the input 1261 and a phototransistor 1264 configured to receive the light signal and to generate a corresponding signal sig1 on the output 1262. As illustrated in FIG. 2, interface 214 may comprise a driver circuit 128 connected between the output 1262 of circuit 126 and a control terminal of switch 112. The driver circuit 128 is configured to put in shape the signal sig1 provided to the control terminal of switch 112.

More particularly, the circuit CTRL is configured to control switch 112 so that a voltage Vsrc on node 122, referenced to potential GND2, has a value equal to a set point value. The set point value of voltage Vsrc is determined by the supply power negotiated between the devices 200 and 400 (FIG. 1). Indeed, a set point value of the voltage Vbus, thus of the voltage Vsrc, is determined by the negotiated supply power, for example, by means of a PDO (Power Data Object as described in USB Power Delivery specification).

The control circuit CTRL is further configured to control switch 114. In other words, the circuit CTRL is configured to provide a control signal sig2 to a control terminal of switch 114. In particular, the control circuit CTRL is configured to close switch 114 so that a voltage Vsrc on node 122 is transmitted to terminal 120, the voltage Vbus being then equal to the voltage Vsrc. Although not illustrated in FIG. 2, a driver circuit may be provided between the circuit CTRL and a control terminal of switch 114; the driver circuit is configured to put in shape the signal sig2 provided to switch 114.

The inventors propose to monitor the value, i.e. the root means square value, of the voltage $V_{AC}$ by using a voltage $V_T$ on the interconnection node 123 between the component 116 and the winding 1102, the voltage $V_T$ being referenced to the potential GND2, to detect when the mains providing the voltage $V_{AC}$ is lost.

To achieve this, the circuit CTRL is configured to compare the voltage $V_T$ to a threshold Vth and to compare the voltage $V_T$ to a threshold Vth_l when the voltage $V_T$ is, in absolute values, above the threshold Vth, the threshold Vth_l being, in absolute values, higher than the threshold Vth.

The threshold Vth is determined so that when the voltage VT is, in absolute values, above the threshold Vth, the voltage VT is representative of the value of the voltage VP and, thus, of the value of the voltage $V_{AC}$.

Indeed, when switch 112 is open and a current flows across winding 1102 and component 116, the voltage VT is equal, in this embodiment, to voltage Vsrc. When switch 112 is open and the current in component 116 ends, the voltage $V_T$ oscillates, in this embodiment, around the potential GND2. When switch 112 is commuted to its closed state, the voltage $V_T$ reaches a steady value representative of the voltage $V_P$. More precisely, when the voltage $V_{AC}$ has a value close to its nominal value, the steady value of the voltage $V_T$ is higher, in absolute values, than the value of the voltage Vsrc or than the maximal value of the oscillations of voltage $V_T$, these two values being both determined by the set point value of the voltage Vsrc.

Thus, the threshold Vth is determined so that the voltage $V_T$ has a steady value representative of that of the voltage $V_P$ when the voltage $V_T$ is, in absolute values, above the threshold Vth. Said in other words, the threshold Vth is, in absolute values, higher than the value of the voltage $V_T$ when a current is flowing across the winding 1102 and of the maximal value of the oscillations of the voltage $V_T$. Thus, the threshold Vth is determined by the set point value of the voltage Vsrc, i.e. by the set point value of the voltage Vbus.

As the set point value of the voltage Vbus may change during the operation of interface 214, the circuit CTRL is configured to adapt the value of the threshold Vth when the set point value of the voltage Vbus changes.

The threshold Vth_l is determined so that, when the voltage $V_T$ has a steady value representative of the value of the voltage $V_P$, the voltage $V_T$ is, in absolutes values, below the threshold Vth_l if the value of the voltage $V_P$ is below a nominal value of voltage $V_P$, the nominal value of voltage $V_P$ being determined by the nominal value of the voltage $V_{AC}$. In other words, the threshold Vth_l is determined by the nominal value of the voltage $V_{AC}$.

Indeed, when the mains is lost, the voltage $V_P$ progressively decreases from its nominal value. This decrease of the value of the voltage $V_P$ is detected when the steady value of voltage $V_T$ becomes, in absolute values, lower than the threshold Vth_l. In other words, this decrease of the voltage $V_P$ is detected when the value of the voltage $V_T$ is comprised between the thresholds Vth and Vth_l, which indicates that the mains was lost.

According to one embodiment, the circuit CTRL is configured to detect the nominal value of the voltage $V_{AC}$, and to adapt the threshold Vth_l to the detected nominal value of the voltage $V_{AC}$. This detection may be done by comparing, when the voltage $V_T$ is, in absolute value, above the threshold Vth, the value of the voltage $V_T$ to a first threshold determined by a first nominal value of the voltage $V_{AC}$ and to a second threshold determined by a second nominal value of the voltage $V_{AC}$. Indeed, when the first nominal value, for example, 110 V, is lower than the second nominal value, for example, 230 V, the first threshold is, in absolute values, lower than the second threshold. The comparison of the steady value of voltage $V_T$ to the first and second thresholds thus allows us to determine which of the first and second nominal values the voltage $V_{AC}$ has.

According to one embodiment, when the circuit CTRL detects that the voltage $V_T$ is between the threshold Vth et Vth_l, the circuit CTRL is configured to send a message to the load 400 (FIG. 1) coupled to the interface 214, via the communication terminals CC1 and CC2. The message informs load 400 that mains 201 is lost, and that interface 214 will soon stop providing a power supply to load 400. Preferably, the message is an ALERT message according to the USB Power Delivery Specification Revision 3.0.

According to one embodiment, when the circuit CTRL detects that the voltage $V_T$ is between the threshold Vth and Vth_l, the circuit CTRL is configured to send a request to the load 400 (FIG. 1) coupled to the interface 214, via the communication terminals CC1 and CC2, to swap, if possible, the role (load or source) of the devices 200 and 400. Indeed, devices 200 and 400 can have the ability to exchange their power roles when they are of the type DRP (Dual Role Power). Preferably, the request is of the FRS (Fast Request Swap) type, which is defined in the USB Power Delivery Specification Revision 3.0. An FRS request can be sent only if the devices 200 and 400 have previously agreed that FRS is supported.

According to one embodiment, the circuit CTRL is further configured to compare the voltage $V_T$ to a threshold Vth_h, when the voltage $V_T$ has a steady value representative of the voltage $V_P$. The threshold Vth_h is determined by the nominal value of the voltage $V_{AC}$ and is, in absolute values, higher than the threshold Vth_l.

The threshold Vth_h is determined so that, when the voltage $V_T$ has a steady value representative of the value of the voltage $V_P$, the voltage $V_T$ is, in absolutes values, above the threshold Vth_h if the value of the voltage $V_P$ is above its nominal value. A value of voltage $V_P$ above its nominal value indicates an issue on the mains, and more particularly, that the voltage $V_{AC}$ has a value above its nominal value.

Indeed, when the value of the voltage $V_{AC}$ becomes higher than its nominal value, the voltage $V_P$ progressively increases from its corresponding nominal value. This increase of the voltage $V_P$ is detected when the steady value of voltage $V_T$ becomes, in absolute values, higher than the threshold Vth_h.

According to one embodiment, when the circuit CTRL detects that the voltage VT is, in absolute values, above the threshold Vth_h, the circuit CTRL is configured to send a message to the load 400 (FIG. 1) coupled to the interface 214 via the communication terminals CC1 and CC2. The message informs the load 400 that there is an issue on the mains 201. Preferably, the message is an ALERT message according to the USB Power Delivery Specification Revision 3.0.

According to one embodiment, when the circuit CTRL detects that the voltage $V_T$ is, in absolute values, above the threshold Vth_h, the circuit CTRL is configured to send a request to the load 400 (FIG. 1) coupled to the interface 214, via the communication terminals CC1 and CC2, to swap the role (load or source) of the devices 200 and 400 (FIG. 1), when the devices are of the type DRP. Preferably, the request is of the FRS (Fast Request Swap) type, which is defined in the USB Power Delivery Specification Revision 3.0. An FRS request can be sent only if the devices 200 and 400 have previously agreed that FRS is supported.

Figure 3:
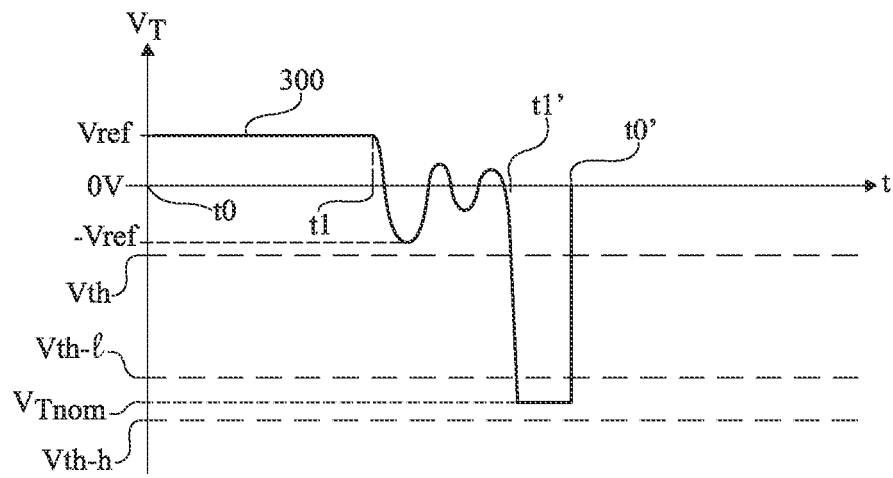
FIG. 3 illustrates an embodiment of a method implemented by the interface of the FIG. 2.

FIG. 3 illustrates an embodiment of a method implemented by the interface 214 of the FIG. 2.

Curve 300 illustrates the evolution of the voltage VT during a switching cycle of switch 112. Switch 112 is open between an instant t0 and an instant t1', and is closed between the instant t1' and an instant t0', the instant t0 corresponding to the beginning of the switching cycle and the instant t0' corresponding to the end of the switching cycle, thus to the beginning of the next switching cycle.

From the instant t0 to an instant t1, the switch 112 is open and a current is flowing across the winding 1102 and the component 116, the voltage $V_T$ being then equal to voltage Vsrc, the value of which being equal to a set point value Vref of the voltage Vbus, which is determined by the negotiated power supply.

From the instant t1 to the instant t1', the voltage $V_T$ oscillates. The maximal peak-to-peak amplitude of the oscillations equals two times the set point value Vref. Thus, voltage $V_T$ oscillates between a maximal value equal to Vref and a minimal value equal to −Vref.

From the instant t1' to the instant t0', the switch 112 is closed and no current flows across the winding 1102. The voltage $V_T$ is then equal to $-(n1/n2)*V_P$, where n1 is the number of winding turns of the winding 1101 and n2 is the number of winding turns of the winding 1102.

Thus, in this embodiment where component 116 is connected between winding 1102 and node 122 (FIG. 2), the thresholds Vth, Vth_l, and Vth_h are negative.

In this embodiment, the threshold Vth is chosen to be, in absolute value, higher than the set point value Vref, for example, higher than the set point value plus one volt. More precisely, the threshold Vth is chosen to be lower than the value −Vref. As an example, Vth=−Vref−1V. As a result, when the voltage $V_T$ is, in absolute values, above Vth, voltage $V_T$ has a steady value representative of that of voltage $V_P$.

In this embodiment, the threshold Vth_l is chosen to be, in absolute values, below a value $V_{Tnom}$ equal to $-(n1/n2)*V_{Pnom}$ where $V_{Pnom}$ is the nominal value of the voltage $V_P$, i.e. the value of the voltage $V_P$ when voltage $V_{AC}$ has its nominal value. Further, as previously indicated, the threshold Vth_l is chosen to be, in absolute values, higher than the threshold Vth. More precisely, the threshold Vth_l is chosen between threshold Vth and value $V_{Tnom}$.

In this embodiment, the threshold Vth_h is chosen to be, in absolute values, above the value $V_{Tnom}$. More precisely, the threshold Vth_h is chosen to be lower than the value $V_{Tnom}$.

In the example of FIG. 3, when the circuit CTRL compares the voltage VT to thresholds Vth, Vth_l, and possibly Vth_h, if the voltage $V_T$ is, in absolute value, above the threshold Vth, the voltage $V_T$ is also, in absolute values, above the threshold Vth_l and below the threshold Vth_h. The circuit CTRL thus determines that the value of the voltage $V_{AC}$ is close, even equal, to its nominal value.

In another example not illustrated, when the circuit CTRL compares the voltage $V_T$ to thresholds Vth, Vth_l and possibly Vth_h, if the voltage $V_T$ is comprised between the thresholds Vth and Vth_l, the circuit CTRL thus determinates that the mains was lost, and if the voltage $V_T$ is, in absolute value, above the threshold Vth_h, the circuit CTRL thus determinates that there is an overvoltage issue with the mains.

Figure 4:
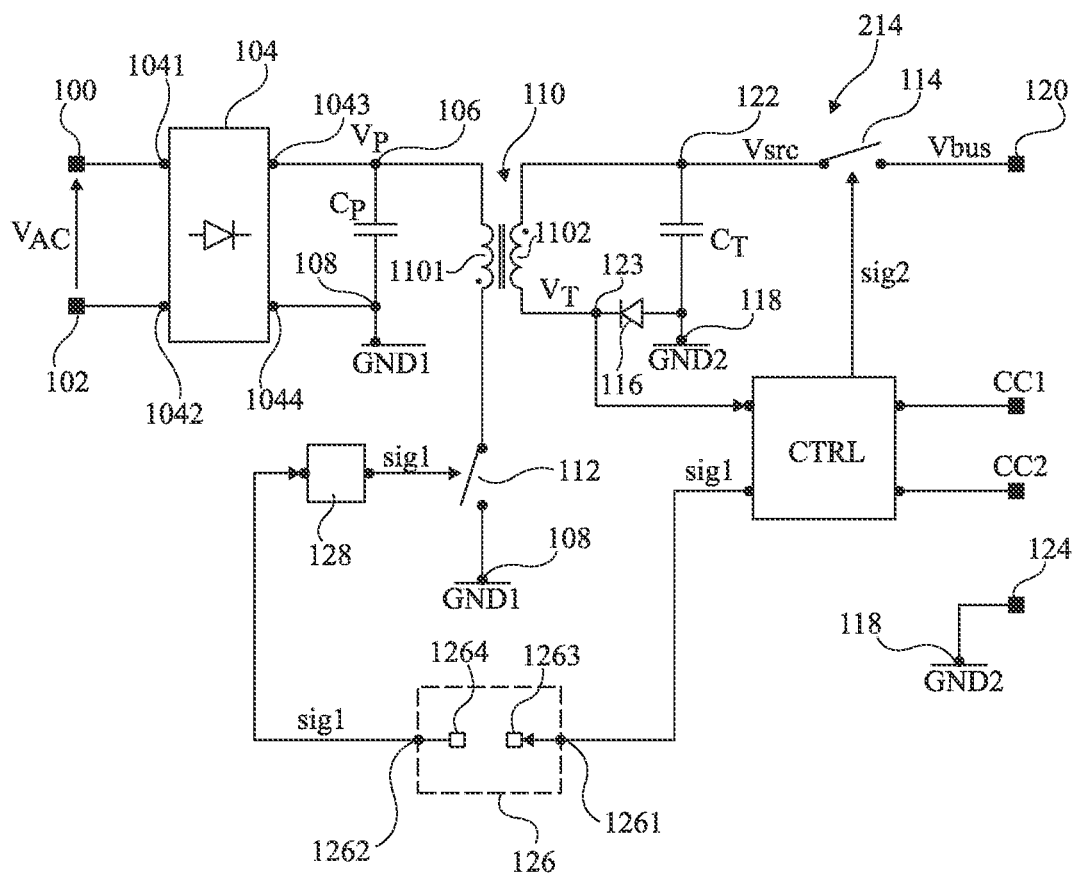
FIG. 4 illustrates an alternative embodiment of the USB interface of FIG. 2.

FIG. 4 illustrates an alternative embodiment of the USB interface 214 of FIG. 2.

Only the differences between the interface 214 of the embodiment described in relation to FIG. 2 and the interface 214 of the alternative embodiment illustrated by FIG. 4 are here described.

In particular, interface 214 of FIG. 4 differs from the one of FIG. 2 in that the secondary winding 1102 is connected between node 122 and component 116, component 116 is connected between node 118 and the winding 1102, the phase point of the winding 1101 is on the side of node 108 and the phase point of the winding 1102 is on the side of the node 122. As in FIG. 2, the node 123 is the interconnection node between the winding 1102 and the component 116.

Figure 5:
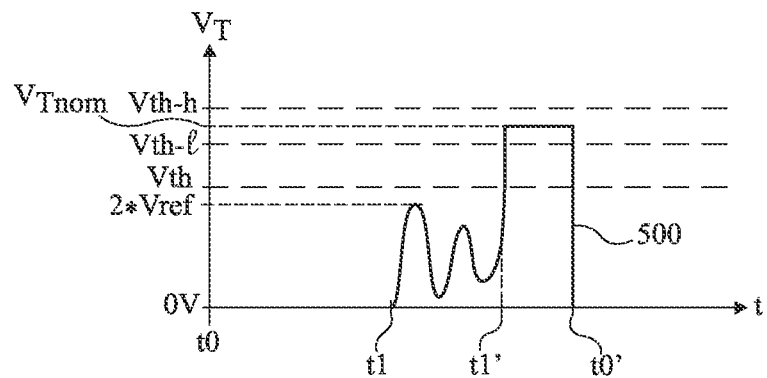
FIG. 5 illustrates an alternative embodiment of the method of FIG. 2 implemented by the interface of FIG. 4.

FIG. 5 illustrates an embodiment of a method implemented by the interface 214 of the FIG. 4.

Curve 500 illustrates the evolution of the voltage $V_T$ during a switching cycle of switch 112, the switch 112 being open between an instant t0 and an instant t1', and being closed between the instant t1' and an instant t0', the instant t0 corresponding to the beginning of the switching cycle and the instant t0' corresponding to the end of the switching cycle, thus to the beginning of the next switching cycle.

From the instant t0 to an instant t1, a current flows across the winding 1102 and the component 116, the voltage $V_T$ being then equal to voltage GND2. Thus, between instants t0 and t1, voltage $V_T$ is null.

From the instant t1 to the instant t1', the voltage $V_T$ oscillates. The maximal peak-to-peak amplitude of the oscillation is equal to two times the set point value Vref. Thus, voltage $V_T$ oscillate between a maximal value equal to 2*Vref and a minimal value equal to zero.

Between the instants t1' and t0', the switch is closed and no current flows across the winding 1102. The voltage $V_T$ is then equal to $(n1/n2)*V_P+$Vsrc, where n1 is the number of winding turns of the winding 1101 and n2 is the number of winding turns of the winding 1102. As the value of the voltage Vsrc is equal to the set point value Vref, the voltage $V_T$ is then equal to $(n1/n2)*V_P+$Vref.

Thus, in this embodiment where component 116 is connected between winding 1102 and node 118 (FIG. 4), the thresholds Vth, Vth_l, and Vth_h are positive.

In this embodiment, the threshold Vth is chosen to be higher than two times the set point value Vref, for example, higher than two times the set point value plus one volt. As an example, Vth=2*Vref+1 V. As a result, when the voltage $V_T$ is above Vth, voltage $V_T$ has a steady value representative of that of voltage $V_P$.

In this embodiment, the threshold Vth_l is chosen to be below a value $V_{Tnom}$ equal to $(n1/n2)*V_{Pnom}+Vref$, where $V_{Pnom}$ is the nominal value of the voltage $V_P$, i.e. the value of the voltage $V_P$ when voltage $V_{AC}$ has its nominal value. Further, as previously indicated, the threshold Vth_l is chosen to be higher than the threshold Vth.

In this embodiment, the threshold Vth_h is chosen to be above the value $V_{Tnom}$.

In the example of FIG. 4, when the circuit CTRL compares the voltage $V_T$ to thresholds Vth, Vth_l and possibly Vth_h, if the voltage $V_T$ is above the threshold Vth, the voltage $V_T$ is also above the threshold Vth_l and below the threshold Vth_h. The circuit CTRL thus determines that the value of the voltage $V_{AC}$ is close, even equal, to its nominal value.

In another example not illustrated, when the circuit CTRL compares the voltage $V_T$ to thresholds Vth, Vth_l and possibly Vth_h, if the voltage $V_T$ is comprised between the thresholds Vth and Vth_l, the circuit CTRL thus determinates that the mains was lost, and if the voltage $V_T$ is above the threshold Vth_h, the circuit CTRL thus determinates that there is an overvoltage issue with the mains.

Figure 6:
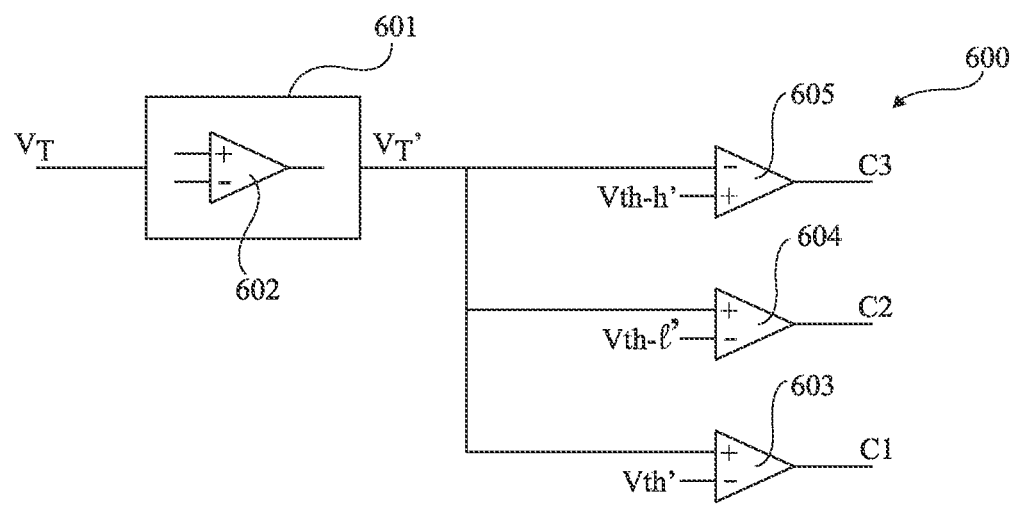
FIG. 6 illustrates an example embodiment of a part of the interfaces of FIGS. 2 and 4.

FIG. 6 illustrates an example embodiment of a part of the interfaces of FIGS. 2 and 4 and, more precisely, of a comparison circuit 600 of the circuit CTRL, which is configured to compare voltage $V_T$ with thresholds Vth, Vth_l, and Vth_h.

The circuit 600 comprises an input stage 601 comprising an operational amplifier 602. Stage 601 receives the voltage VT and provides a voltage VT', the value of which is representative of that of voltage $V_T$.

In the case where winding 1102 is connected between node 118 and component 116, as illustrated in FIG. 2, stage 601 is, for example, configured to shift the voltage VT and to divide it so that the output voltage $V_T'$ has a positive value.

In the case where the winding 1102 is connected between node 122 and component 116 as illustrated in FIG. 4, stage 601 is, for example, configured to subtract the voltage Vsrc or Vref from the voltage $V_T$ and to divide the result, so that the output voltage $V_T'$ has a positive value independent from the value of the voltage Vsrc.

The circuit 600 further comprises comparator 603. The comparator 603 is configured to compare the value of the voltage $V_T$ with the threshold Vth, by comparing the voltage $V_T'$ with a voltage Vth' representative of the threshold Vth. In particular, when stage 601 provides a positive voltage $V_T'$, the voltage Vth' is positive, simplifying the implementation of the comparator 603.

An input of the comparator 603 receives voltage Vth' and another input of the comparator 603 receives the voltage $V_T'$. A binary signal C1 is outputted by the comparator 603. Signal C1 is at a first level when the voltage $V_T'$ is above the voltage Vth', which indicates that the voltage $V_T$ is, in absolute value, above the threshold Vth, signal C1 being at a second level when the voltage $V_T'$ is below the voltage Vth', which indicates that the voltage $V_T$ is, in absolute value, below the threshold Vth. In this example, the voltage $V_T'$ is received by the non-inverting input (+) of the comparator 604, and the voltage Vth' is received by the inverting input (−) of the comparator 604. As a result, signal C1 is at a high level when the voltage $V_T'$ is above the voltage Vth' and at low level when the voltage $V_T'$ is below the voltage Vth'.

The circuit 600 comprises comparator 604. The comparator 604 is configured to compare the value of the voltage $V_T$ with the threshold Vth_l, by comparing the voltage $V_T'$ with a voltage Vth_l' representative of the threshold Vth_l.

In particular, when stage 601 provides a positive voltage $V_T'$, the voltage Vth_l' is positive, simplifying the implementation of the comparator 604. Moreover, when stage 601 provides a voltage VT' independent from the voltages Vsrc and Vref, the voltage Vth_l' is independent from voltages Vsrc and Vref, which simplifies the implementation of the comparator 604 because voltage Vth_l' does not change when set point value Vref is changed.

An input of the comparator 604 receives voltage Vth_l' and another input of the comparator 604 receives the voltage $V_T'$. A binary signal C2 is outputted by the comparator 604. Signal C2 is at a first level when the voltage $V_T'$ is above the voltage Vth_l', which indicates that the voltage $V_T$ is, in absolute value, above the threshold Vth_l, signal C2 being at a second level when the voltage $V_T'$ is below the voltage Vth_l', which indicates that the voltage $V_T$ is, in absolute value, below the threshold Vth_l. In this example, the voltage $V_T'$ is received by the non-inverting input (+) of the comparator 604 and the voltage Vth_l' is received by the inverting input (−) of the comparator 604. As a result, the binary signal C2 is at a high level when the voltage $V_T'$ is above the voltage Vth_l' and at low level when the voltage $V_T'$ is below the voltage Vth_l'.

The circuit 600 comprises comparator 605. The comparator 605 is configured to compare the value of the voltage $V_T$ with the threshold Vth_h, by comparing the voltage $V_T'$ with a voltage Vth_h' representative of the threshold Vth_h.

In particular, when stage 601 provides a positive voltage $V_T'$, the voltage Vth_h' is positive, simplifying the implementation of the comparator 605. Moreover, when the stage 601 provides a voltage $V_T'$ independents from the voltages Vsrc and Vref, the voltage Vth_h' is independent from voltages Vsrc and Vref, which simplifies the implementation of the comparator 605 because voltage Vth_h' does not change when set point value Vref is changed.

An input of the comparator 605 receives voltage Vth_h' and another input of the comparator 605 receives the voltage $V_T'$. A binary signal C3 is outputted by the comparator 605. Signal C3 is at a first level when the voltage $V_T'$ is above the voltage Vth_h', which indicates that the voltage $V_T$ is, in absolute value, above the threshold Vth_h, signal C3 being at a second level when the voltage $V_T'$ is below the voltage Vth_h', which indicates that the voltage $V_T$ is, in absolute value, below the threshold Vth_h. In this example, the voltage $V_T'$ is received by the inverting input (−) of the comparator 605 and the voltage Vth_h' is received by the non-inverting input (+) of the comparator 605. As a result, the binary signal C3 is at a high level when the voltage $V_T'$ is below the voltage Vth_h' and at low level when the voltage $V_T'$ is above the voltage Vth_h'.

Based on the value or level of the signals C1, C2, and C3, the circuit CTRL determines whether there is an issue on the mains.

In this example, when the signal C1 is at its high level, the circuit CTRL determines that there is an issue with the mains if one of the signals C2 and C3 is at its low level.

In an embodiment where the voltage $V_T$ is not compared to threshold Vth_h, the comparator 605 of the circuit 600 is omitted.

Those skilled in the art are capable of implementing the circuit CTRL, in particular when the comparison of the voltage $V_T$ with the thresholds Vth, Vth_l and possibly Vth_h is implemented with another circuit than the one described in relation with FIG. 6. For example, this comparison may be implemented by sampling the voltage $V_T$ with an analog-to-digital converter and by comparing the binary codes provided at the converter output with binary codes representative of the thresholds Vth, Vth_l, and possibly Vth_h.

Various embodiments and variants have been described. Those skilled in the art will understand that certain features of these embodiments can be combined and other variants will readily occur to those skilled in the art. In particular, the component 116 may be a switch rather than a diode, the switch 116 being then controlled by the circuit CTRL, opposite to that of the switch 112.

Finally, the practical implementation of the embodiments and variants described herein is within the capabilities of those skilled in the art based on the functional description provided hereinabove. In particular, those skilled in the art are capable of implementing the circuit CTRL and determining the value of the thresholds Vth, Vth_l, and Vth_h.

What is claimed is:

1. A method for operating a universal serial bus (USB) interface, the method comprising:
receiving, at an input terminal, an AC input voltage;
controlling, by a control circuit, a first switch such that a voltage at a first terminal of a second switch equals a set point value, the first switch having a first terminal coupled to a primary winding of a transformer, the first switch having a second terminal coupled to reference ground, the first terminal of the second switch coupled to a secondary winding of the transformer, the second switch having a second terminal coupled to an output terminal of the USB interface;
comparing, by the control circuit, a first voltage to a first threshold, the first voltage being a voltage at the secondary winding and representative of the AC input voltage;
comparing, by the control circuit, the first voltage to a second threshold in response to the first voltage being greater than the first threshold in absolute values; and
communicating, by the control circuit, a message with a load coupled to the output terminal of the USB interface based on the result of the comparison of the first voltage to the first threshold, the second threshold, or both.

2. The method of claim 1, wherein the first threshold is based on a set point value of a voltage at the output terminal.

3. The method of claim 1, wherein the second threshold is determined by a nominal value of the AC input voltage.

4. The method of claim 1, wherein a relative polarity of a voltage on the primary winding is opposite to a relative polarity of the first voltage.

5. The method of claim 1, where communicating the message is based on an absolute value of the first voltage being below the second threshold.

6. The method of claim 1, wherein the message indicates that the USB interface will stop providing power supply.

7. The method of claim 1, wherein the message is an ALERT message according to USB Power Delivery Specification Revision 3.0.

8. A universal serial bus (USB) interface, comprising:
an input terminal configured to receive an AC input voltage;
a transformer having a primary winding and a secondary winding;
a first switch having a first terminal coupled to the primary winding, the first switch having a second terminal coupled to reference ground;
a second switch having a first terminal coupled to the secondary winding, the second switch having a second terminal coupled to an output terminal of the USB interface; and
a control circuit configured to:
control the first switch such that a voltage at the first terminal of the second switch equals a set point value,
compare a first voltage to a first threshold, the first voltage being a voltage at the secondary winding and representative of the AC input voltage,
compare the first voltage to a second threshold in response to the first voltage being greater than the first threshold in absolute values, and
communicate a message with a load coupled to the output terminal of the USB interface based on the result of the comparison of the first voltage to the first threshold, the second threshold, or both.

9. The USB interface of claim 8, wherein the first threshold is based on a set point value of a voltage at the output terminal of the USB interface.

10. The USB interface of claim 8, wherein the second threshold is determined by a nominal value of the AC input voltage.

11. The USB interface of claim 8, wherein a relative polarity of a voltage on the primary winding is opposite to a relative polarity of the first voltage.

12. The USB interface of claim 8, where communicating the message is based on an absolute value of the first voltage being below the second threshold.

13. The USB interface of claim 8, wherein the message indicates that the USB interface will stop providing power supply to the load.

14. The USB interface of claim 8, wherein the message is an ALERT message according to USB Power Delivery Specification Revision 3.0.

15. A method for operating a universal serial bus (USB) interface, the method comprising:
preventing current circulation, by a first circuit, in a secondary winding of a transformer in response to a first switch being in a closed configuration, the first switch coupled between a first node and a second node, the first circuit coupled in series between a third node and reference ground, the transformer having a primary winding and a secondary winding;
comparing, by a control circuit, a first voltage to a first threshold, the first voltage corresponding to a voltage at an interconnection node between the secondary winding and the control circuit;
comparing, by the control circuit, the voltage to a second threshold in response to the first voltage being greater than the first threshold in absolute values; and
providing an output voltage of the USB interface at a first terminal, a second switch coupled between the first terminal and the third node.

16. The method of claim 15, wherein the first threshold is based on a set point value of the output voltage.

17. The method of claim 15, wherein the second threshold is determined by a nominal value of an AC input voltage to the USB interface.

18. The method of claim 15, wherein a relative polarity of a voltage on the primary winding is opposite to a relative polarity of a voltage on the secondary winding.

19. The method of claim 15, further comprising communicating, by the control circuit, a message with a load coupled to an output terminal of the USB interface based on an absolute value of the first voltage being below the second threshold.

20. The method of claim 19, wherein the message indicates that the USB interface will stop providing power supply to a load at an output of the USB interface.

* * * * *